(12) United States Patent
Lee

(10) Patent No.: US 8,060,799 B2
(45) Date of Patent: Nov. 15, 2011

(54) HUB, MEMORY MODULE, MEMORY SYSTEM AND METHODS FOR READING AND WRITING TO THE SAME

(75) Inventor: Kee-Hoon Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1750 days.

(21) Appl. No.: 11/030,328

(22) Filed: Jan. 7, 2005

(65) Prior Publication Data

US 2005/0278495 A1      Dec. 15, 2005

(30) Foreign Application Priority Data

Jun. 11, 2004  (KR) .................. 10-2004-0043022
Sep. 22, 2004  (KR) .................. 10-2004-0075773

(51) Int. Cl.
*G11C 29/00* (2006.01)
(52) U.S. Cl. ........................................ 714/718
(58) Field of Classification Search ............ 714/718, 714/719
See application file for complete search history.

(56) References Cited

U.S. PATENT DOCUMENTS

| | | | |
|---|---|---|---|
| 4,782,486 A | 11/1988 | Lipcon et al. | |
| 5,748,914 A * | 5/1998 | Barth et al. ................. | 710/105 |
| 6,317,352 B1 | 11/2001 | Halbert et al. | |
| 6,501,690 B2 * | 12/2002 | Satoh ............................ | 365/201 |
| 6,961,880 B2 * | 11/2005 | Frankowsky ................. | 714/718 |
| 7,054,802 B2 * | 5/2006 | Ohkami ......................... | 703/15 |
| 7,177,211 B2 * | 2/2007 | Zimmerman ................. | 365/201 |
| 7,206,978 B2 * | 4/2007 | Kuzmenka et al. ............ | 714/56 |
| 7,395,476 B2 * | 7/2008 | Cowell et al. ................. | 714/734 |
| 7,539,909 B2 * | 5/2009 | LeClerg et al. ............... | 714/718 |
| 7,539,910 B2 * | 5/2009 | Ahn et al. ...................... | 714/718 |
| 2005/0283681 A1 * | 12/2005 | Jeddeloh ........................ | 714/42 |

FOREIGN PATENT DOCUMENTS

| | | |
|---|---|---|
| CN | 1031148 | 2/1989 |
| EP | 1 244 110 | 9/2002 |
| JP | 62-216059 | 9/1987 |
| JP | 2000-066964 | 3/2000 |

OTHER PUBLICATIONS

Office Action dated Oct. 31, 2008 for corresponding Chinese Application No. 100727110.0 and English translation thereof.
English translation of Office Action dated Apr. 23, 2007 for corresponding German Application No. 10 2005 015828.5.
Howard David et al., "Fully Buffered DIMM (FB-DIMM) Design Consideration," Intel Corp., Feb. 18, 2004.
Office Action dated Sep. 27, 2010 in corresponding Japanese Patent Application No. 2005-162842.

* cited by examiner

*Primary Examiner* — James C Kerveros
(74) *Attorney, Agent, or Firm* — Harness, Dickey & Pierce, PLC

(57) ABSTRACT

A hub, a memory module, a memory system, and methods for reading and writing to the same. In a test mode, memory module, memory device or memory unit identifying information may be ignored, so that all memory modules, memory devices or memory units may be test written or test read. Ignoring the memory identifying information may permit all the memory modules, memory devices or memory units to be written or read simultaneously, thereby decreasing test time.

33 Claims, 17 Drawing Sheets

FIG. 6D
Conventional Art

| DRAM Cmnds | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| Activate | DS2 | DS1 | DS0 | 1 | DRAM Addr | | RS | DRAM Bank & Address | | | | | | | | | | | | | | | | |
| Write | DS2 | DS1 | DS0 | 0 | 1 | 1 | RS | DRAM Bank & Address | | | | | | | | | | | | | | | | |
| Read | DS2 | DS1 | DS0 | 0 | 1 | 0 | RS | DRAM Bank & Address | | | | | | | | | | | | | | | | |
| Precharge All | DS2 | DS1 | DS0 | 0 | 0 | 1 | RS | x | x | x | x | 1 | 1 | 1 | x | x | x | x | x | x | x | x | x | x |
| Precharge Single | DS2 | DS1 | DS0 | 0 | 0 | 1 | RS | DRAM Bank | | | 1 | 1 | 0 | x | x | x | x | x | x | x | x | x | x |
| Auto (CBR) Refresh | DS2 | DS1 | DS0 | 0 | 0 | 1 | RS | x | x | x | x | 1 | 0 | 1 | x | x | x | x | x | x | x | x | x | x |
| Enter Self Refresh | DS2 | DS1 | DS0 | 0 | 0 | 1 | RS | x | x | x | x | 1 | 0 | 0 | x | x | x | x | x | x | x | x | x | x |
| Exit Self Refresh / Exit Power Down | DS2 | DS1 | DS0 | 0 | 0 | 1 | RS | x | x | x | x | 0 | 1 | 1 | x | x | x | x | x | x | x | x | x | x |
| Enter Power Down | DS2 | DS1 | DS0 | 0 | 0 | 1 | RS | x | x | x | x | 0 | 1 | 0 | x | x | x | x | x | x | x | x | x | x |
| reserved | x | x | x | 0 | 0 | 1 | x | x | x | x | x | 0 | 0 | x | x | x | x | x | x | x | x | x | x | x |

Note: The values in "X" fields in non-reserved commands above may be driven onto the DRAM device pins.

module selection bits

CMD rank selection bit

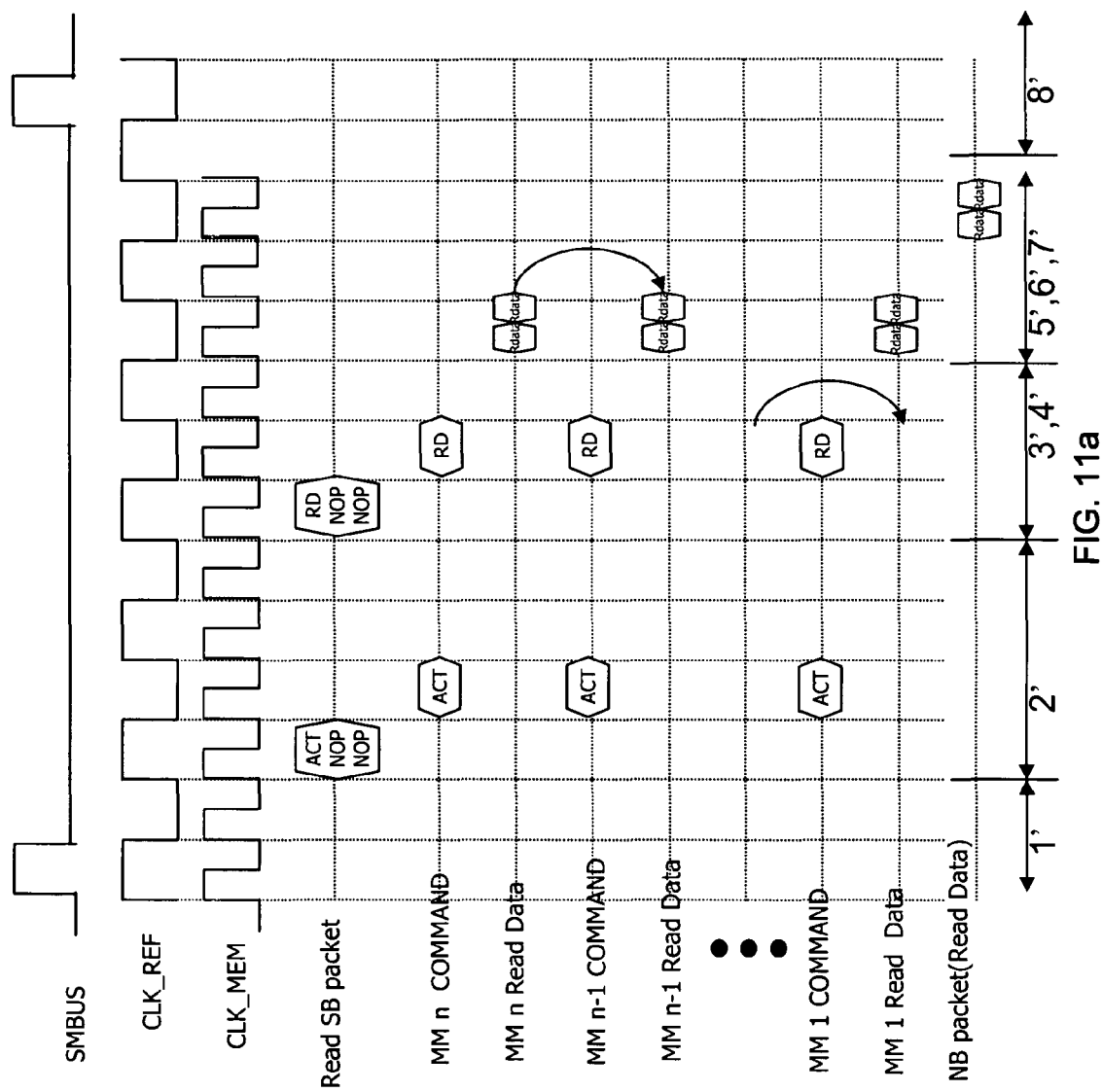

HUB, MEMORY MODULE, MEMORY SYSTEM AND METHODS FOR READING AND WRITING TO THE SAME

PRIORITY STATEMENT

This application claims the benefit under 35 U.S.C. §119(a) of Korean Patent Application No. 2004-0043022, filed on Jun. 11, 2004, and No. 2004-0075773, filed on Sep. 22, 2004, the contents of which are hereby incorporated by reference in their entirety.

BACKGROUND OF THE INVENTION

FIG. 1 illustrates several types of conventional memory modules including single in-line memory modules (SIMM) and dual in-line memory modules (DIMM). SIMMs have memory chips on one side of the memory module, wherein DIMMs have memory chips on both sides of the memory module. DIMMs may further be defined as registered DIMMs (R-DIMM) and fully buffered DIMMs (FBDIMM).

In an R-DIMM, signals except data signals are transferred from a memory controller to the memory chips, via one or more registers. In a FBDIMM, all signals from a memory controller are passed to the memory chips through a hub or advanced memory buffer (AMB). As shown in FIG. 1, FBDIMMs may be advantageous for higher speed and/or higher density applications.

FIG. 2 illustrates a conventional FBDIMM including a hub and a plurality of memory chips. A hub may receive a southbound (SB) packet from a memory controller or an adjacent FBDIMM at receiver R and transmit the SB packet to an adjacent FBDIMM via a transmitter T. The hub may also receive a northbound packet (NB) from an adjacent FBDIMM and transmit it to the memory controller or an adjacent FBDIMM using a receiver R and transmitter T, from the opposite direction. A hub may provide clock (CLK) signals, control (CON) signals, and/or address (ADDR) signals to the plurality of memory chips. A hub may exchange data (DATA) back and forth between the plurality of memory chips.

FIG. 3 illustrates a conventional memory system including a host (for example, a memory controller) and a plurality of memory modules. CLK signals, southbound signals (STx) and northbound signals (NRx) are illustrated consistent with FIG. 2. A conventional memory system, such as the memory system illustrated in FIG. 3, may include FBDIMMs.

FIG. 4 illustrates a conventional memory system, such as the conventional memory system of FIG. 3 from a different perspective. The eight (8) memory modules (for example, FBDIMMs) of FIG. 4 are said to be connected in a "daisy chain" connection, wherein the plurality of memory modules are serially connected by a daisy chain bus. In such an arrangement, signals to and from the memory controller are transferred to each adjacent memory module in order.

FIG. 5 illustrates a conventional memory system in more detail. As shown in FIG. 5, the host (for example, a memory controller) includes a transmitter STx which transmits southbound packets (for example, high speed southbound packets) to a first FBDIMM MM1 and a receiver NRx, which receives northbound packets from the first FBDIMM MM1. A southbound packet may include FBDIMM selection bits, rank selection bits, control signals, address signals, and/or data to be written. Northbound packet may include data read from one of the plurality of FBDIMMs MM1-MMn. Each of the plurality of FBDIMMs (MM1-MMn) may include a hub, as shown in FIGS. 2-4. In addition to a hub, each of the plurality of FBDIMMs (MM1-MMn) may also include a plurality of memory devices M1-Mn, which receives memory information and execute read or write operations in accordance with the memory information.

As shown in FIG. 5, a hub may further include a southbound receiver SRx, a southbound transmitter STx, a northbound receiver NRx, a northbound transmitter NTx, and a control circuit. A southbound receiver (STx) receives a southbound packet from a first (or memory controller) or adjacent FBDIMM. A southbound transmitter STx transmits the southbound packet to an adjacent FBDIMM (except the last hub in the daisy chain).

The control circuit may decode a southbound packet into memory information which may include, for example, FBDIMM selection bits, rank selection bits, control signals, address signals, and/or data signals. The control signals may include /CS, /RAS, /CAS, and /WE, for example.

The control circuit may supply the memory information to a memory interface, memory register, or memory interface register, such as the DRAM interface DRAM IF shown in FIG. 5 (if the memory chips M1-Mn are DRAM memories). The memory interface, memory register, or memory interface register, such as the DRAM interface DRAM IF, receives the memory information and transfers the memory information to the plurality of memory devices M1-Mn.

The control circuit may also encode read data from plurality of memory devices M1-M2 via the memory interface, memory register, or memory interface register into packet format.

The northbound receiver NRx of each hub (except the last hub in the daisy chain) may receive northbound packets from an adjacent FBDIMM and the northbound transmitter NTx may transmit received northbound packets to the host (or memory controller) or adjacent FBDIMM.

FIG. 6A illustrates an example, conventional southbound (SB) packet format. As shown in FIG. 5, a southbound packet is transferred in a direction away from the host. The SB packet may include 10 bits and each bit may toggle 12 times in one cycle of a memory clock, as shown in FIG. 6A. The first four toggles, represented by "A" in FIG. 6A may contain a cyclic redundancy check (CRC) code and a command (CMD)/address (ADDR) code. A CRC code is a signal that may be utilized for identifying an error in the transferred signals. The remaining toggles, represented by "B" may contain data to be written or other commands (CMD).

FIG. 6B illustrates an example, conventional northbound (NB) packet format. As shown in FIG. 5, a northbound packet is transferred in a direction toward the host. As shown in FIG. 6B, a northbound packet may include 14 bits each of which toggles 12 times in one cycle of a memory clock. The northbound packet may be divided into one or more read frames, for example, read frame 1 (RDF1) and read frame 2 (RDF2), as illustrated in FIG. 6B.

FIG. 6C illustrates an example relationship between a reference clock (CLK_REF), a memory clock (CLK_MEM), and a packet transition. As illustrated in the example of FIG. 6C, CLK_MEM has a frequency double the frequency of CLK_REF and there are 12 packet transitions in one cycle of CLK_MEM.

FIG. 6D illustrates an example FBDIMM southbound (SB) command decoding system, including several example commands that may be used to control a DRAM. As illustrated, FIG. 6D illustrates memory information decoded from a southbound packet. As shown in FIG. 6D, a southbound packet may include module selection bits, command bits, one or more rank selection bits and address information.

As shown in the example of FIG. 6D, bits 21-23 may be used to select one FBDIMM among the plurality of FBDIMMS and may be defined as module selection bits. As set forth above, conventional memory systems may include eight FBDIMMS. As a result, 3 bits (bits 21-23) are needed to identify a particular FBDIMM.

As shown in the example of FIG. 6D, bits 20-18 may be used to identify the desired command CMD that may be used to control the FBDIMM.

As indicated in the above example of FIG. 6D, a single bit (bit 17) may be used to select the rank of the selected FBDIMM. The rank is defined which side of the FBDIMM, the desired FBDIMM is on.

As shown in the example of FIG. 6D, bits 16-0 may be used to identify the bank and address of the desired memory.

FIG. 7 is a timing diagram that illustrates write and read operations of a southbound (SB) packet in the conventional system illustrated in FIG. 5. FIG. 7 illustrates the reference clock CLK_REF, the memory clock, CLK_MEM, SB packets, memory modules MM1-MMn, and northbound packets.

In the timing diagram shown in FIG. 7, for a write operation, the reference clock CLK_REF is transferred to the hub from a clock transfer line. As discussed above in conjunction with FIG. 6C, CLK_MEM may have a frequency double the frequency of CLK_REF and may be generated by a phase lock loop (PLL) within the hub.

The southbound SB packet to be written may be transferred to all FBDIMMs in one cycle of CLK_MEM through southbound transmitters STx and southbound receivers SRx. The received write SB packet may be decoded into memory information by each hub. As shown in FIG. 6D, the memory information may include module selection bits, which may be decoded by the hub to indicate that a particular memory module (for example memory module MM1) has been selected. The memory devices on the memory module MM1 execute a write operation in accordance with the memory information. All other memory modules MM2-MMn do not execute the write operation because they were not identified by the module selection bits.

As shown in FIG. 7, for a read operation, a read SB packet may also be transferred to all FBDIMMs in one cycle of CLK_MEM through southbound transmitters STx and southbound receivers SRx. The received read SB packet may also be decoded into memory information by each hub. As shown in FIG. 6D, the memory information may include module selection bits, which may be decoded by the hub to indicate that a particular memory module (for example memory module MM1) has been selected. The memory devices on the memory module MM1 execute a read operation in accordance with the memory information. In particular, read data is transferred from the memory devices of memory module MM1 to the hub of memory module MM1. The hub of memory module MM1 may then encode the read data into northbound packets and transmit the northbound packets to the host or memory controller via northbound transmitters NTx and northbound receivers NRx.

In conventional memory systems, such as the ones described above in conjunction with FIGS. 1-7, it may be advantageous to be able to determine whether each memory module MM1-MMn (for example, each FBDIMM) is operating properly or not. In the conventional memory system described above, including eight (8) FBDIMMs, in order to test each FBDIMM, it is necessary for the system to perform eight (8) write operations and eight (8) read operations. Further, as memories become more densely integrated, more FBDIMMs will be included, and therefore, even more write and read operations will become necessary.

SUMMARY OF THE INVENTION

Example embodiments of the present invention are directed to a hub, a memory module, a memory system, and methods for reading and writing to the same.

In example embodiments, in a test mode, memory module, memory device or memory unit identifying information may be ignored, so that all memory modules, memory devices or memory units may be test written or test read. Ignoring the memory identifying information may permit all the memory modules, memory devices or memory units to be written or read simultaneously, thereby decreasing test time.

In an example embodiment, the present invention is directed to a hub for a memory module including a controller for ignoring memory identification information in a southbound packet from a memory controller in a test mode.

In an example embodiment, the present invention is directed to a hub for memory module including a controller for receiving first output information from memory units of the memory module and comparing the first output information with second output information from a downstream memory module in a test mode and outputting a comparison result.

In an example embodiment, the present invention is directed to a hub including a receiving and transmitting part for receiving a first data packet from a first receiver via a first receiving bus and transmitting the first data packet via a first transmitting bus, and receiving a second data packet from a second receiver via a second receiving bus and transmitting the second data packet via a second transmitting bus, a first interfacing part for receiving a test mode and sending a result of the test mode to and from a memory controller through a third bus, a second interfacing part for sending memory data from the first data packet and receiving data to and from a plurality of memory units, and a packet transaction part for unconditionally transferring the memory information to the plurality of memory units through the second interfacing part in response to the test mode and comparing the second packet with the data output from the plurality of memory units.

In an example embodiment, the present invention is directed to a memory module including a plurality of memory units and a hub, the hub ignoring memory identification information in response to a southbound packet from a memory controller and writing data associated with the southbound packet to each of the plurality of memory units of the memory module in a test mode.

In an example embodiment, the present invention is directed to a memory system including a memory controller and a plurality of memory modules connected to the memory controller in a daisy chain, each of the plurality of memory modules including a hub, each hub ignoring memory identification information in response to a southbound packet from the memory controller and writing data associated with the southbound packet to each of a plurality of memory units of the plurality of memory modules in a test mode.

In an example embodiment, the present invention is directed to a method of writing to a memory system having a host and N memory modules (where N is an integer $\geq 1$) including setting a test mode in the N memory modules, transferring a write packet to the N memory modules, decoding the write packet into memory identification information and memory information in each of the N memory modules, and providing the memory information to memory units on each of the N memory module after ignoring the memory identification information responsive to the test mode, writing a data included the memory information to the memory units on each of the N memory module.

In an example embodiment, the present invention is directed to a memory module including a plurality of memory units and a hub, the hub receiving first output information from the plurality of memory units of the corresponding memory module and second output information from the plurality of memory units of another memory module, comparing the first output information with the second output information in the test mode and outputting a comparison result.

In an example embodiment, the present invention is directed to a memory system including a memory controller and a plurality of memory modules, each including a hub, each hub receiving output information from memory units of the corresponding memory module and comparing the output information for each of the memory units of the corresponding memory modules with output information from another of the memory modules in the test mode and outputting a comparison result.

In an example embodiment, the present invention is directed to a method of reading a memory system having a host and a plurality of modules, including outputting first data to a first hub from a first memory unit on the first memory module in response to a read packet, outputting second data to a second hub from a second memory unit on the second memory module in response to the read packet, transferring the second data to the first hub, and comparing the first data with the second data and storing a comparison result in the first hub.

In an example embodiment, the present invention is directed to a method of testing a memory system having a memory controller and a plurality of memory modules, where the plurality of memory modules are connected to the host by a daisy chain and each of the plurality of memory modules have a module selection code including setting a test mode to the plurality of memory modules, simultaneously writing test data to each of memory units on the plurality of memory modules responsive to a write packet in the test mode, reading the test data from the each of memory units on the plurality of memory modules responsive to a read packet, and comparing the test data from self memory module with the test data from an adjacent memory module.

BRIEF DESCRIPTION OF THE DRAWINGS

The present invention will become more fully understood from the detailed description given below and the accompanying drawings, which are given for purposes of illustration only, and thus do not limit the invention.

FIG. 6D illustrates an example FBDIMM southbound (SB) command decoding system.

FIG. 11A illustrates a timing diagram for reading in a test mode in accordance with an example embodiment of the present invention.

It should be noted that these Figures are intended to illustrate the general characteristics of methods and devices of example embodiments of this invention, for the purpose of the description of such example embodiments herein. These drawings are not, however, to scale and may not precisely reflect the characteristics of any given embodiment, and should not be interpreted as defining or limiting the range of values or properties of example embodiments within the scope of this invention.

DETAILED DESCRIPTION OF EXAMPLE EMBODIMENTS OF THE PRESENT INVENTION

Figure 8:
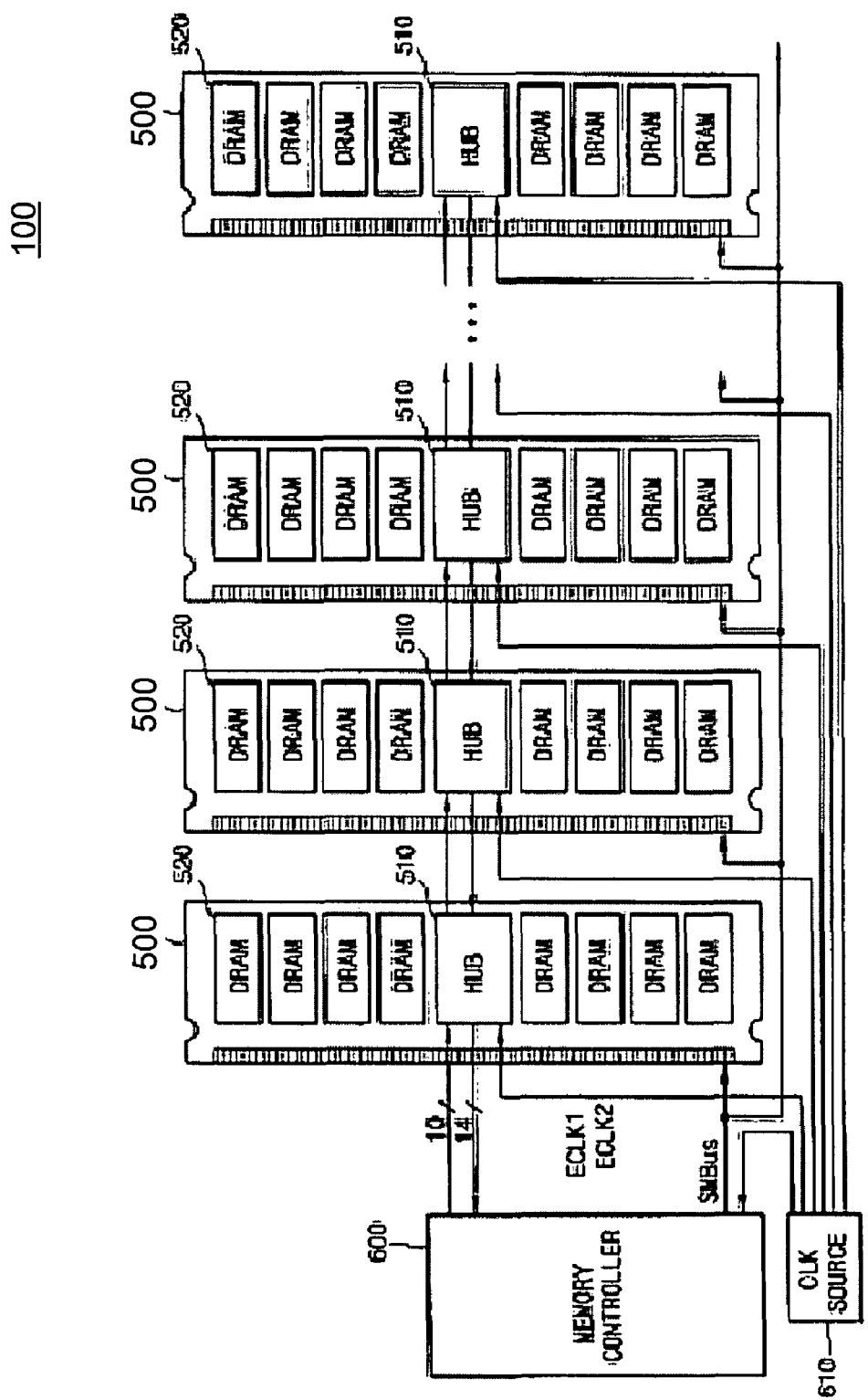
FIG. 8 illustrates a memory system in accordance with an example embodiment of the present invention.

FIG. 8 illustrates a memory system in accordance with an example embodiment of the present invention. As shown in FIG. 8, the memory system 100 may include a memory controller 600, a clock source 610, and a plurality of memory modules 500. Each memory module 500 may further include a plurality of memories, for example, DRAMs 520 and one or more hubs 510.

The memory controller 600 may transfer southbound packet including data, control, and/or address information 10 in a downstream direction to the plurality of memory modules 500 and may receive northbound packet data 14 in a downstream direction from the plurality of memory modules 500. The memory controller 600 may also communicate with the plurality of memory modules 500 via a SMBus. The clock source 610 may supply clocks, such as ECLK1 to the memory controller 600 and/or the plurality of memory modules 500.

In the example embodiment illustrated in FIG. 8, the plurality of memory modules 500 may be fully buffered DIMMs (FBDIMMs).

Further, in the example embodiment of FIG. 8, the plurality memory modules 500 may be connected to the memory controllers 600 in a daisy chain fashion. In the example embodiment illustrated in FIG. 8, the memory system includes eight (8) memory modules 500 (or eight FBDIMMs).

As illustrated, signals 10 and 14 are exchanged between the memory controller 600 and the hubs 510. In an example embodiment, each signal 10, 14 may be a pair of low voltage differential signals.

Figure 1:
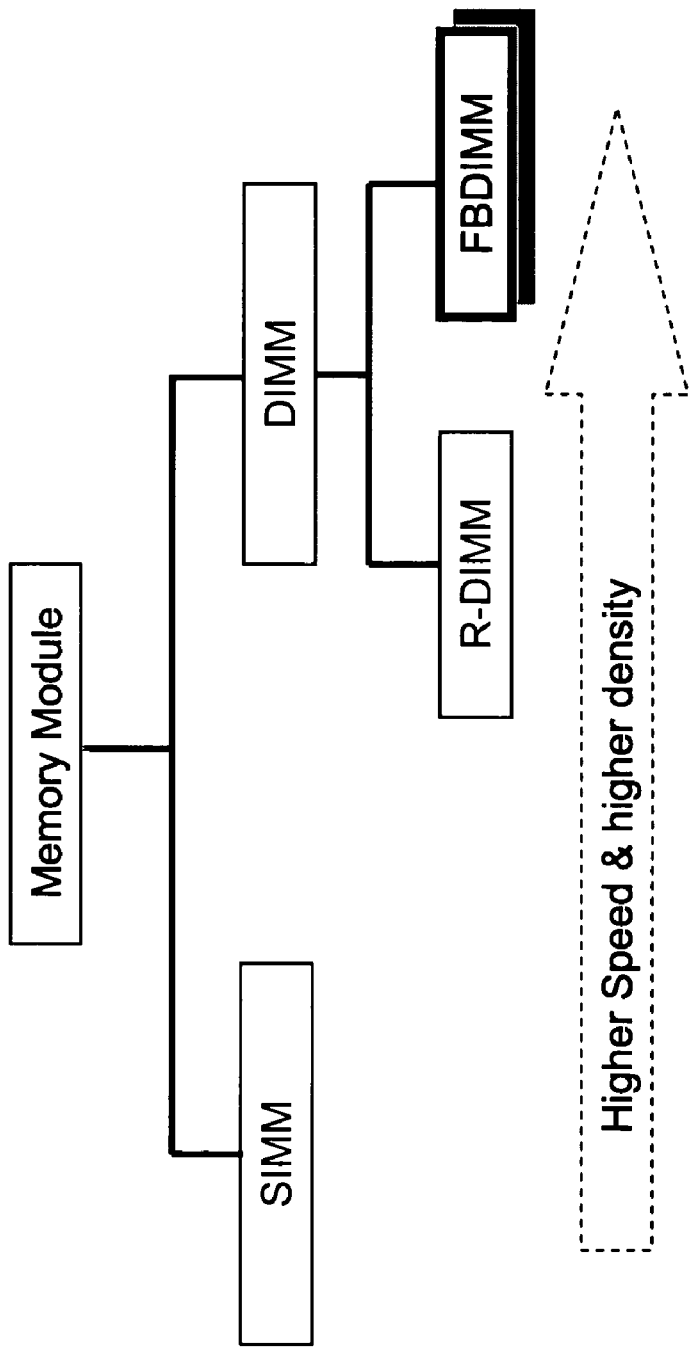
FIG. 1 illustrates several types of conventional memory modules including single in-line memory modules (SIMM) and dual in-line memory modules (DIMM).
Figure 2:
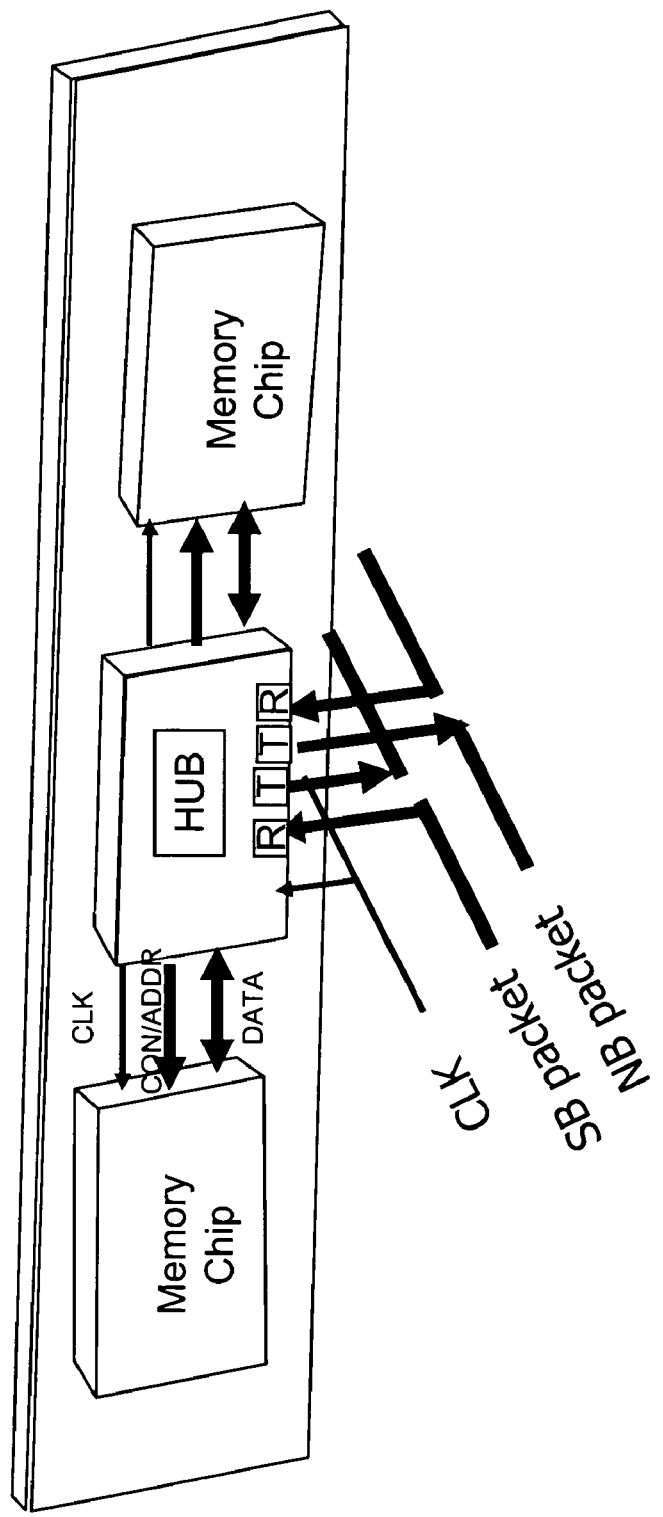
FIG. 2 illustrates a conventional FBDIMM including a hub and a plurality of memory chips.
Figure 3:
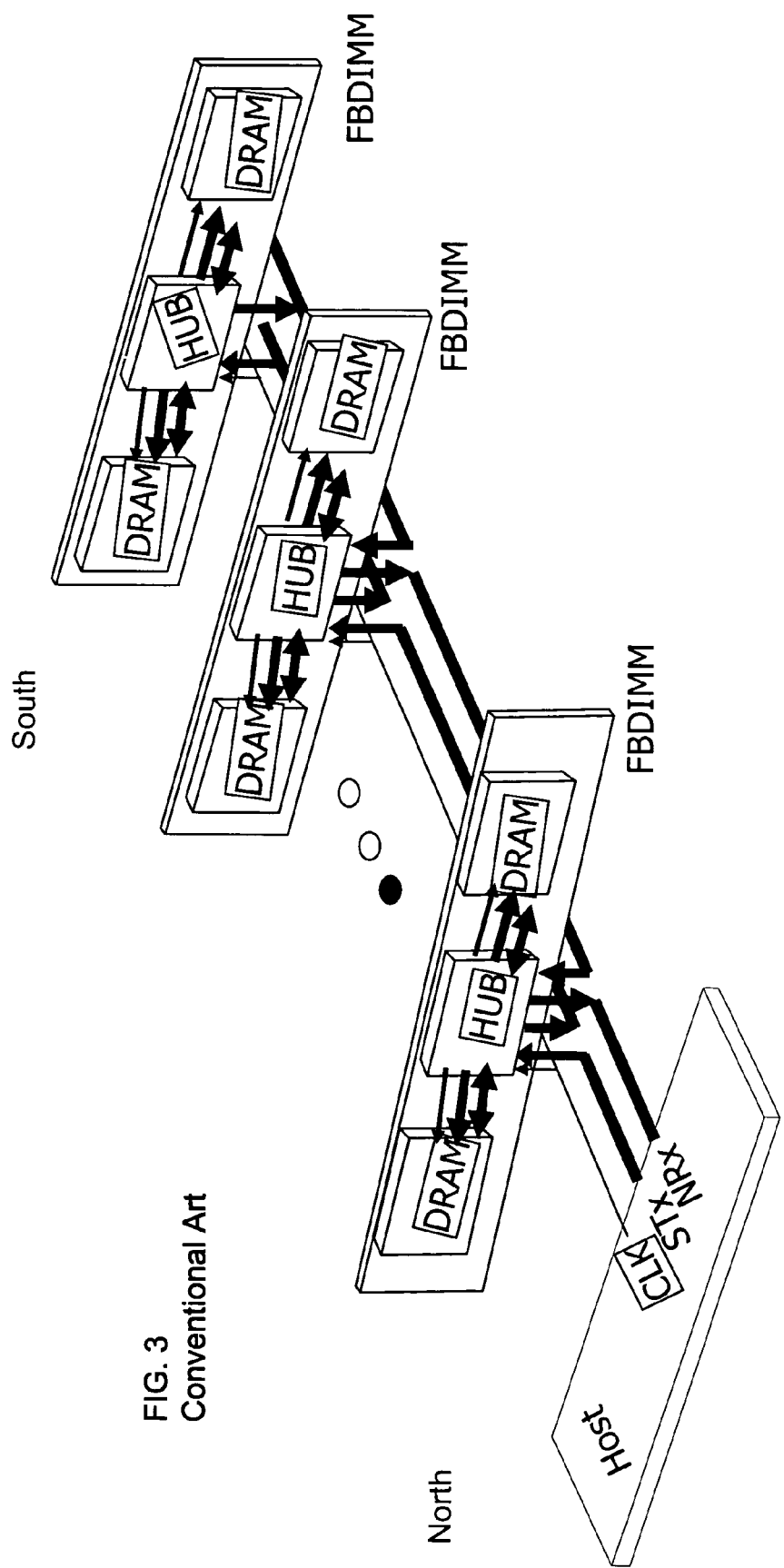
FIG. 3 illustrates a conventional memory system.
Figure 5:
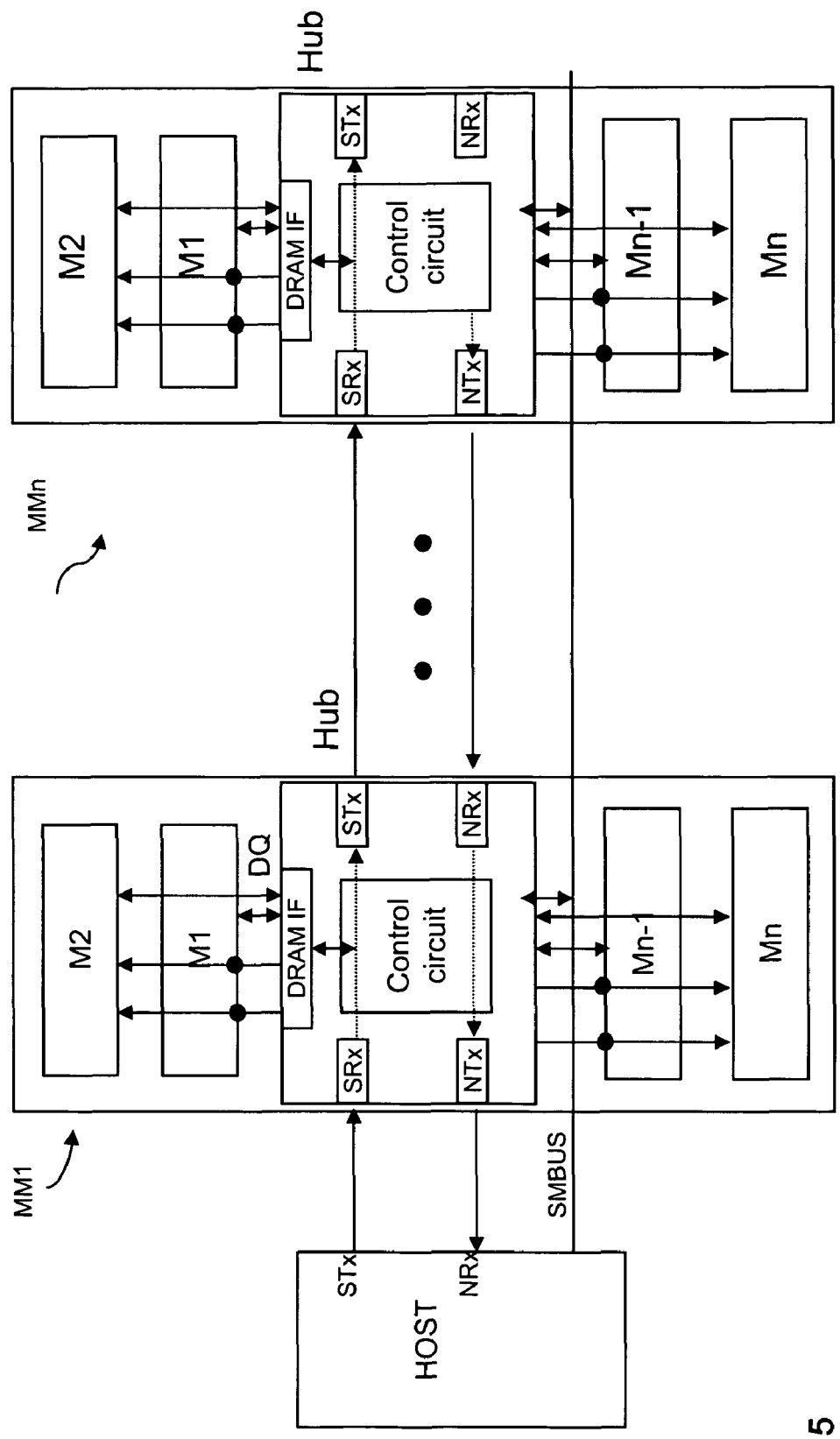
FIG. 5 illustrates a conventional memory system in more detail.
Figure 6A:
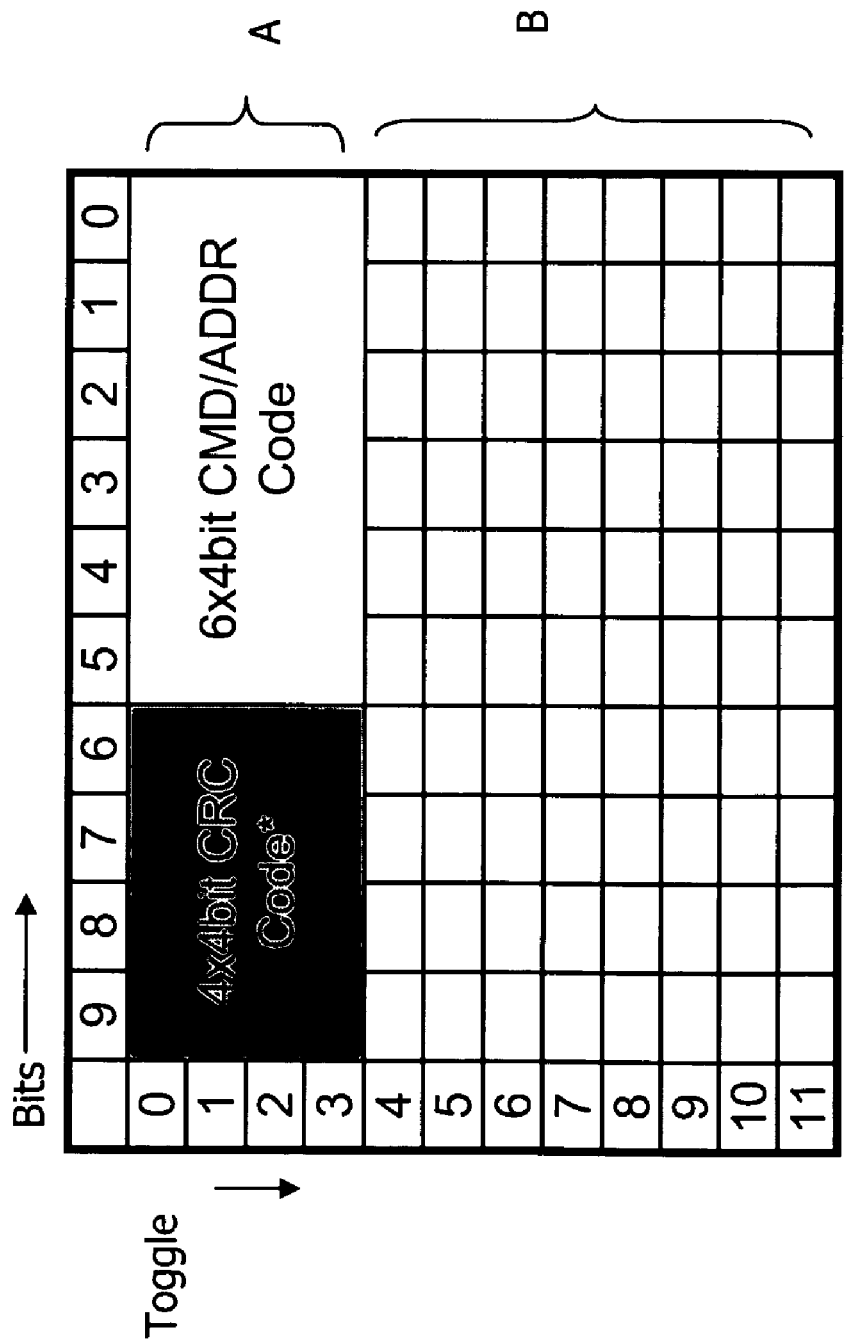
FIG. 6A illustrates an example, conventional southbound (SB) packet format.
Figure 6B:
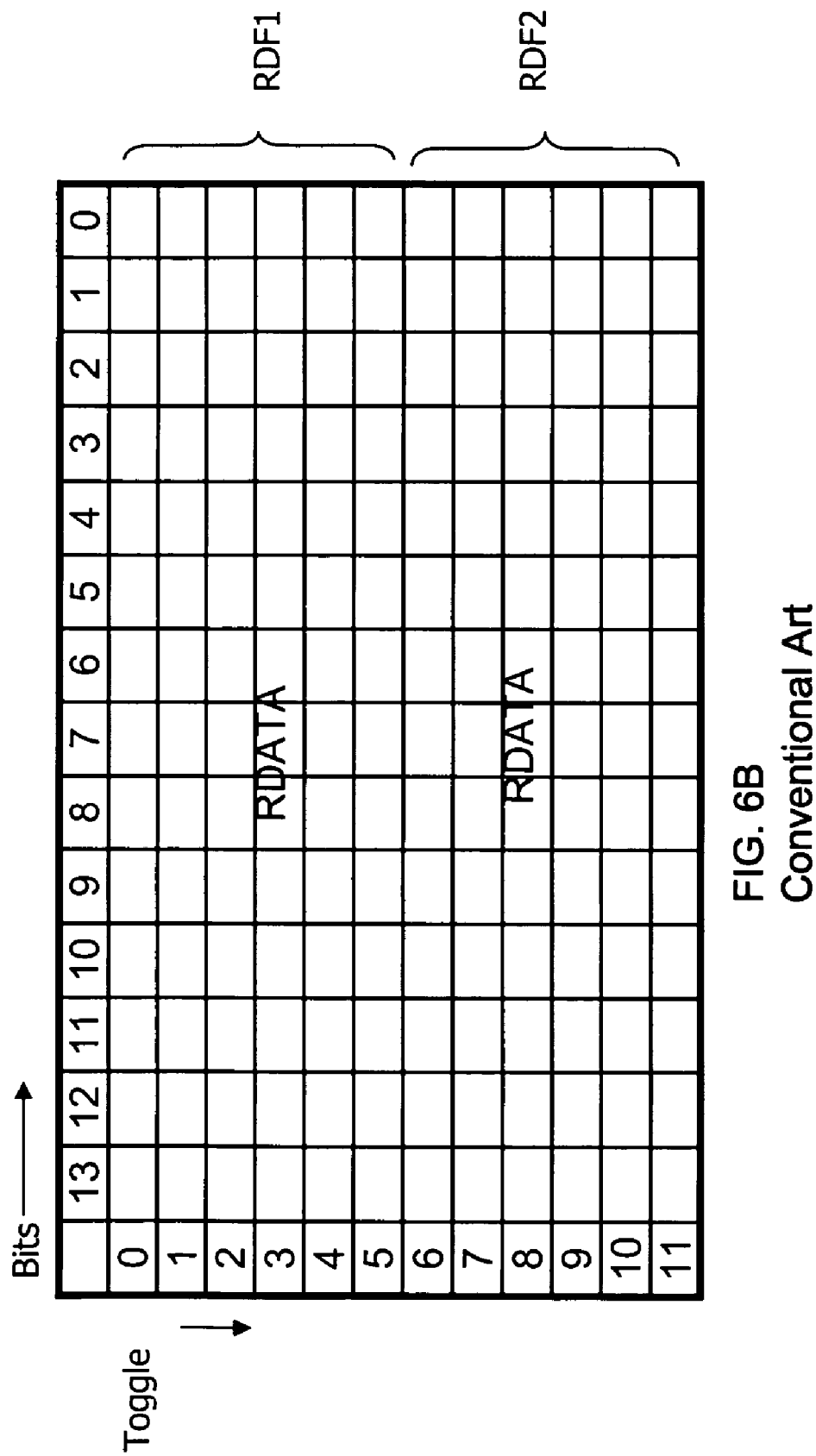
FIG. 6B illustrates an example, conventional northbound (NB) packet format.
Figure 6C:
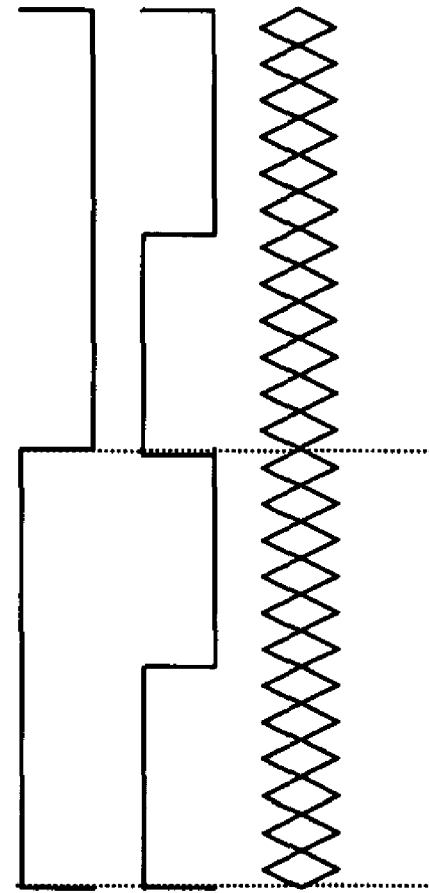
FIG. 6C illustrates an example relationship between a reference clock, a memory clock and a packet transition.
Figure 7:
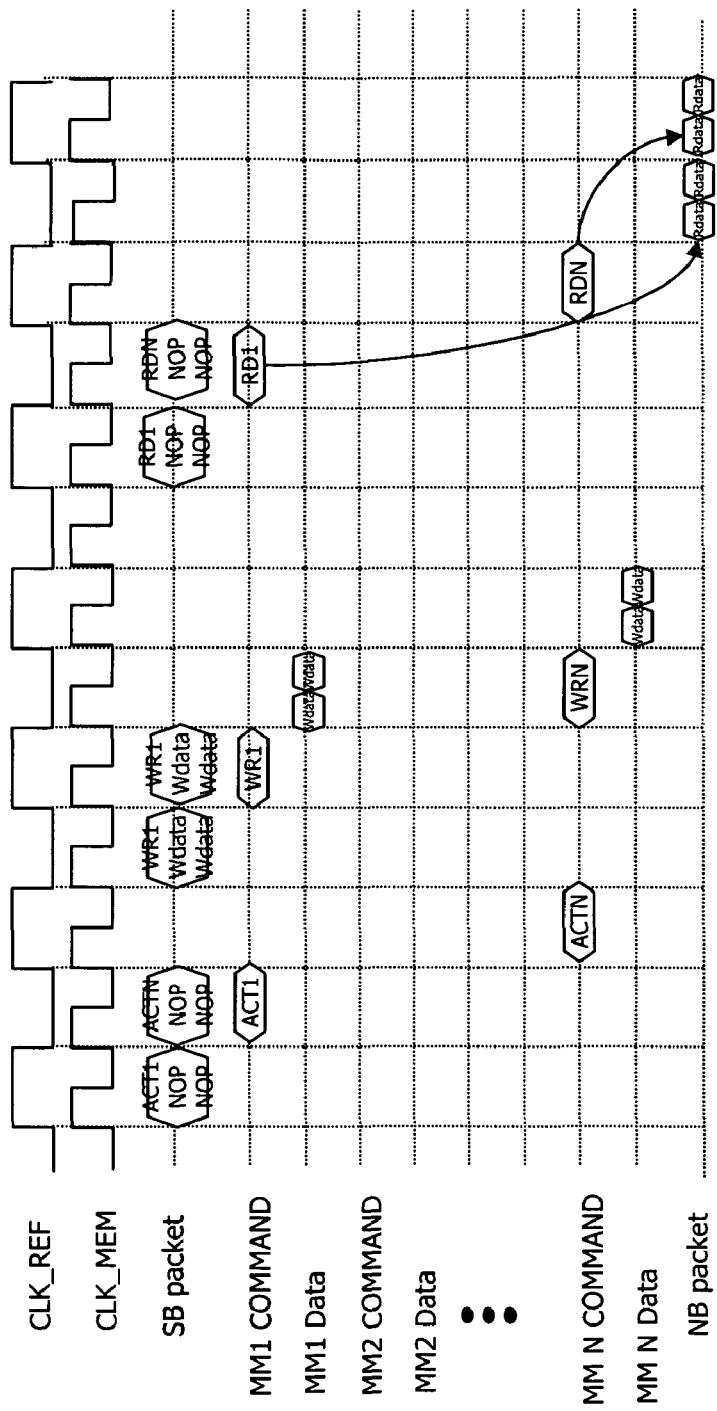
FIG. 7 is a timing diagram that illustrates write and read operations of a southbound (SB) packet in the conventional system illustrated in FIG. 5.
Figure 9:
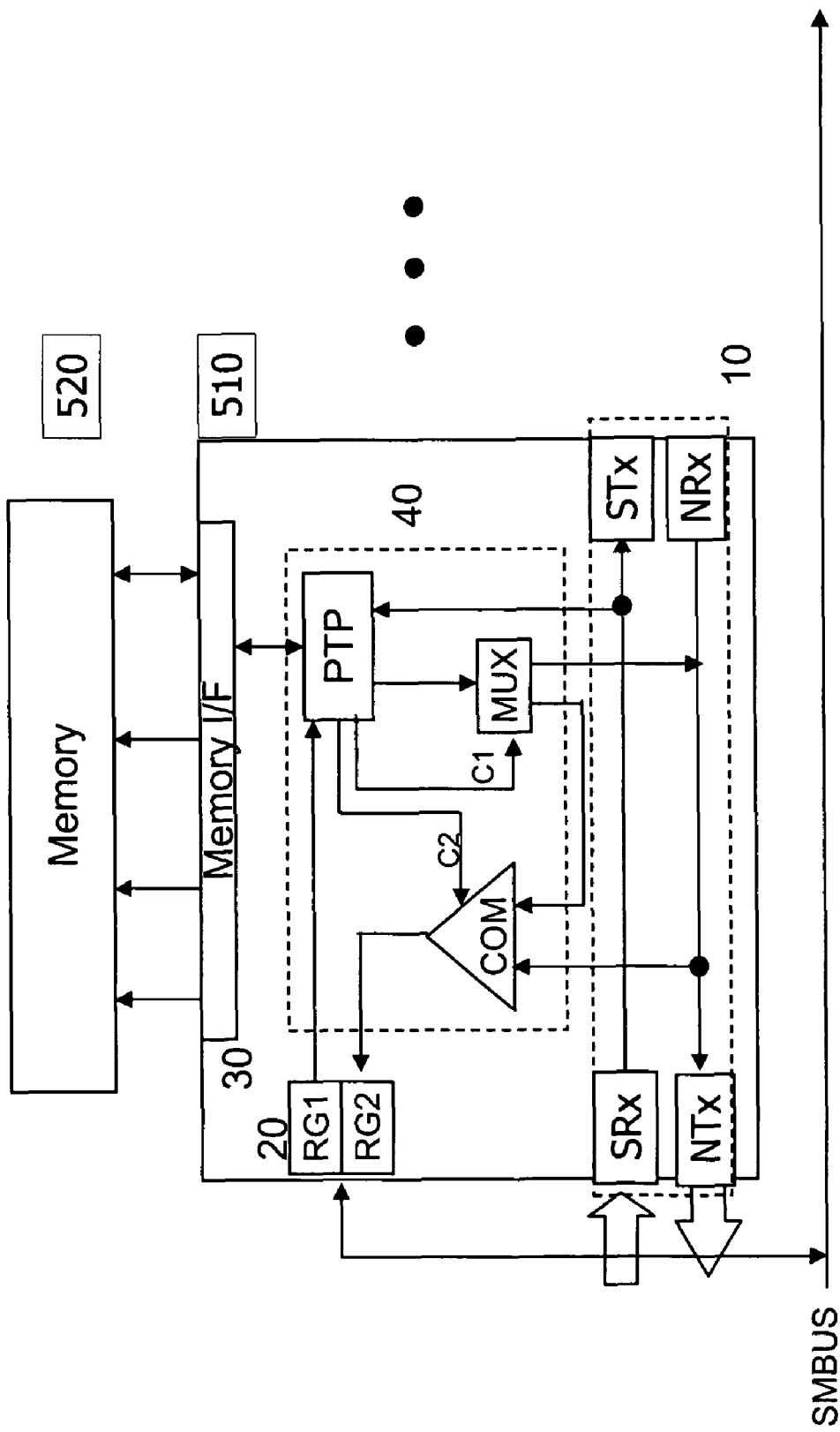
FIG. 9 illustrates a hub in accordance with an example embodiment of the present invention.

FIG. 9 illustrates an example embodiment of a hub, for example, hub 510, in accordance with an example embodiment of the present invention. As illustrated in FIG. 9, each hub 510 may include a receiver/transmitter 10 further including a plurality of receivers and transmitters SRx, STx, NRx, NTx, such as those described above in conjunction with FIGS. 2-3 and 5.

Each hub 510 may also include an interface 20, a memory interface 30, and a control circuit 40. The control circuit 40 may further include a comparator COM, a packet transaction part (PTP), and a multiplexer (MUX).

Figure 4:
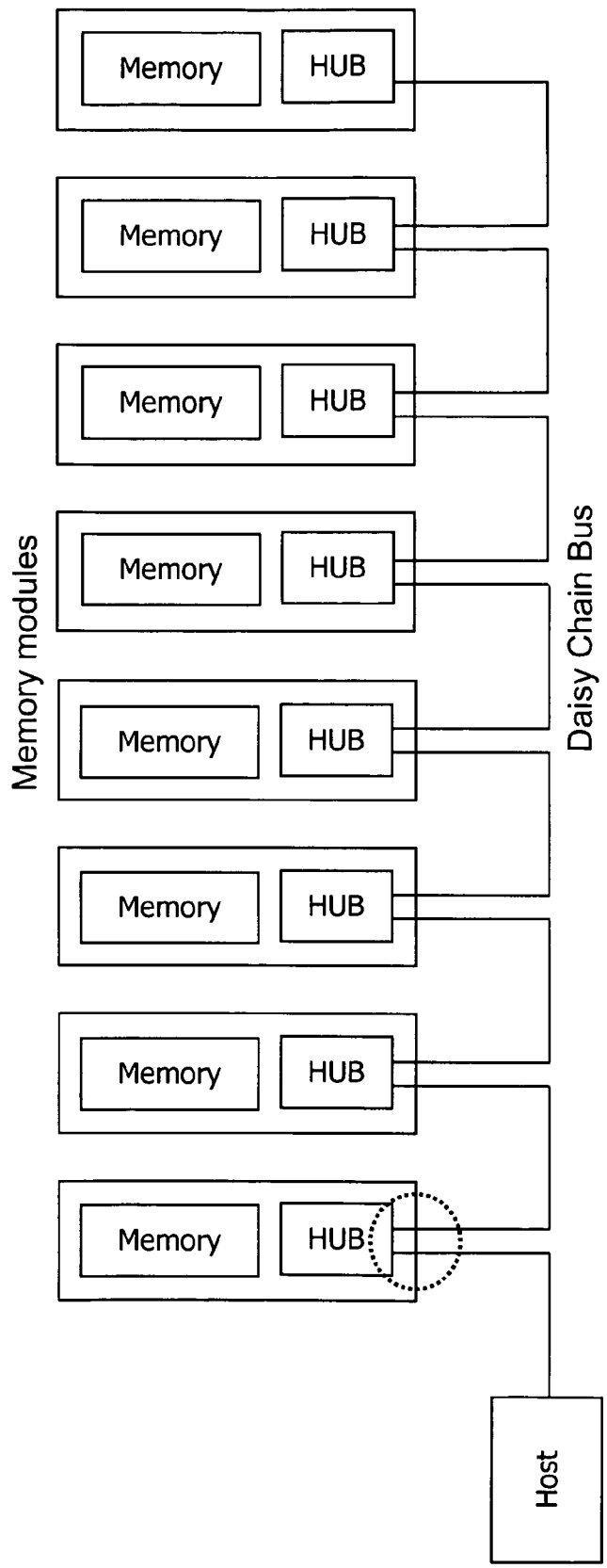
FIG. 4 illustrates the conventional memory system of FIG. 3 from a different perspective.

The receiver/transmitter 10 may receive and/or transmit packets. The receiver/transmitter 10 may transfer packets from a host, such as the host of FIGS. 3-5, a memory controller, such as the memory controller of FIG. 8, or from an adjacent FBDIMM in both directions.

The interface 20 may include a mode register RG1 for setting a test mode and a fail detection register RG2. The interface 20 may receive and transmits system management information to and from the memory controller via the SMBus. In particular, the mode register RG1 may store a test mode signal and may transfer the test mode signal to the PTP. The fail detection register RG2 may receive a fail flag from the comparator COM and may transfer the fail flag to the memory controller via the SMBus.

The memory interface 30 may receive memory information including command, addresses and data information for writing from the PTP and may transfer the memory information to the plurality of memory devices 520. The memory interface 30 may also transfer read data from the plurality of memory devices 520 to the PTP of the control circuit 40.

The PTP may decode the southbound packets from packet format into memory information format which may include module selection bits, command bits, one or more rank selection bits, command information and/or address information.

In a normal mode, a PTP may determine whether the module selection bits indicate the FBDIMM of which the PTP is a part. If the module selection bit indicates the FBDIMM of which the PTP is a part, the PTP may send command and address information to the memory interface 30. Otherwise, the PTP may ignore the memory information. If the command is a write operation, write data is also transferred to the memory interface 30.

In a test mode, the PTP may transfer command and address information to the memory interface 30, regardless of whether the specific FBDIMM is identified (for example, by the module selection bits).

In particular, the multiplexer MUX located between the PTP and the NRx forms a first path and a second path. In normal mode, the MUX transfers an NB packet to the NTx through the first path in response to a first control signal C1 from the PTP.

In a test mode, the MUX transfers an NB packet to the comparator COM through the second path, which is responsive to a first control signal C1 from the PTP. The comparator COM has two inputs, one of which is connected to the NRx and the other of which is connected to the second path of the multiplexer MUX. The comparator COM is enabled by a second control signal C2 from the PTP. An output of the comparator COM is connected to the RG2 for storing a result of the compare operation.

Figure 10A:
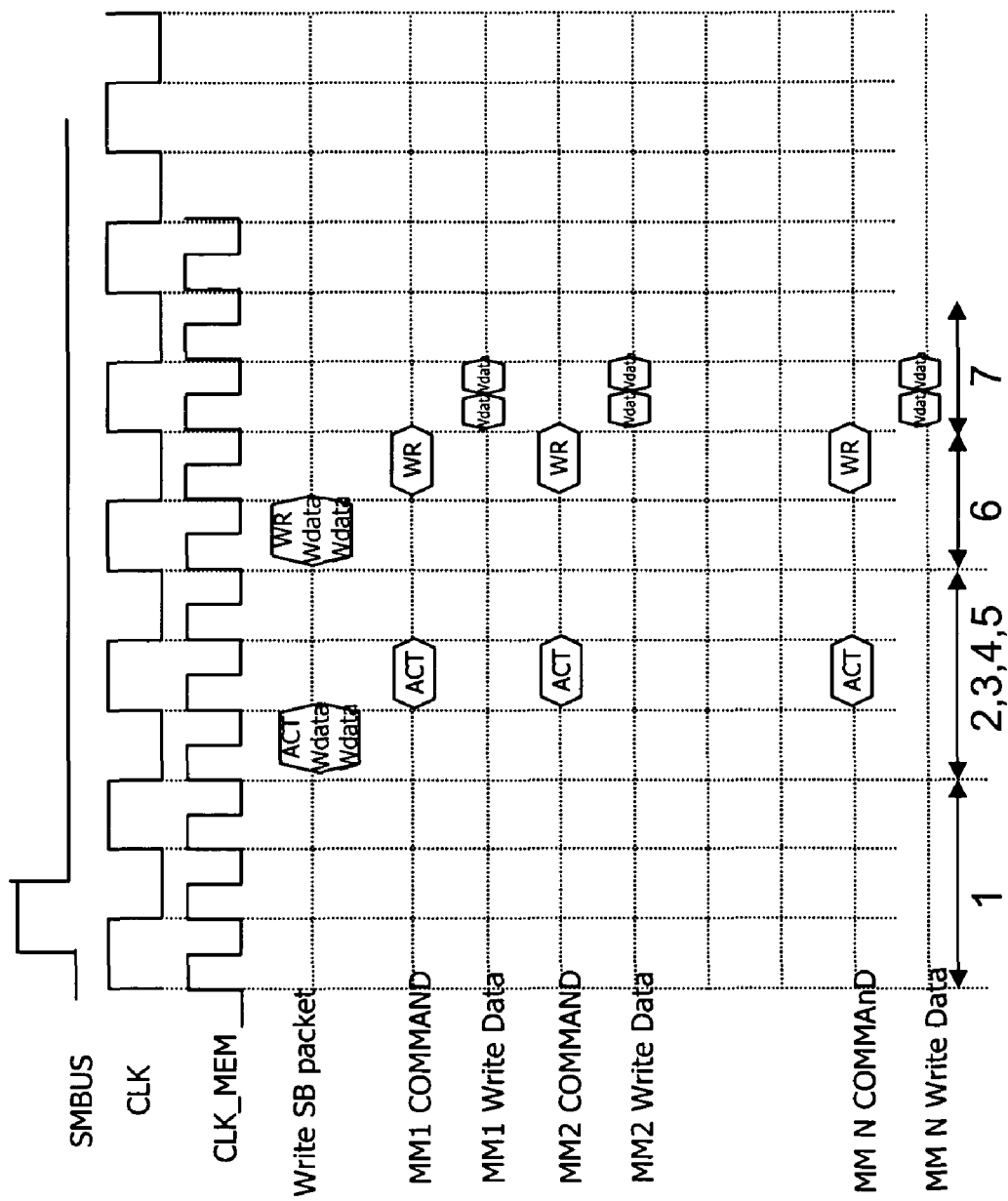
FIG. 10A illustrates a timing diagram for writing in a test mode in accordance with an example embodiment of the present invention.

FIG. 10A illustrates a timing diagram for writing in a test mode in accordance with an example embodiment of the present invention. The embodiment of FIG. 10A illustrates a write operation in test mode. Initially, in a first write period 1, the mode register (RG1) is set by the SMBus. In the test mode, the module selection bits, rank selection bits, and the memory information may be ignored. In a second write period 2, a memory controller 600 transmits active SB packet to the first memory module 500 and the first memory module 500 transmits the active SB packet to an adjacent downstream memory module 500. In this manner, all memory modules 500 receive the active SB packet in one cycle of the CLK_MEM clock.

In a third write period 3, the active SB packet is decoded into memory information in a PTP in each memory module 500. In a fourth write period 4, the memory information is transferred to the memory interface 30 in each hub 510. In a fifth write period 5, the memory devices 520 in each memory module 500 conduct the active operation in accordance with the memory information at the same time. In a sixth write period 6, a write SB packet is transferred to all memory modules 500 from the memory controller 600 in the same manner as the active SB packet.

In particular, the write SB packet is decoded into memory information including module selection bits, rank selection bits, command bits, addresses bits and data in the PTP in each memory module 500. The module selection bits and the rank selection bits are ignored in each PTP in each memory module 500 in response to the test mode. The memory information except the module selection bits and the rank selection bits are transferred to the memory interface 30 in each hub 510. In a seventh write period 7, all memory module 500 conduct the write operation.

Figure 10B:
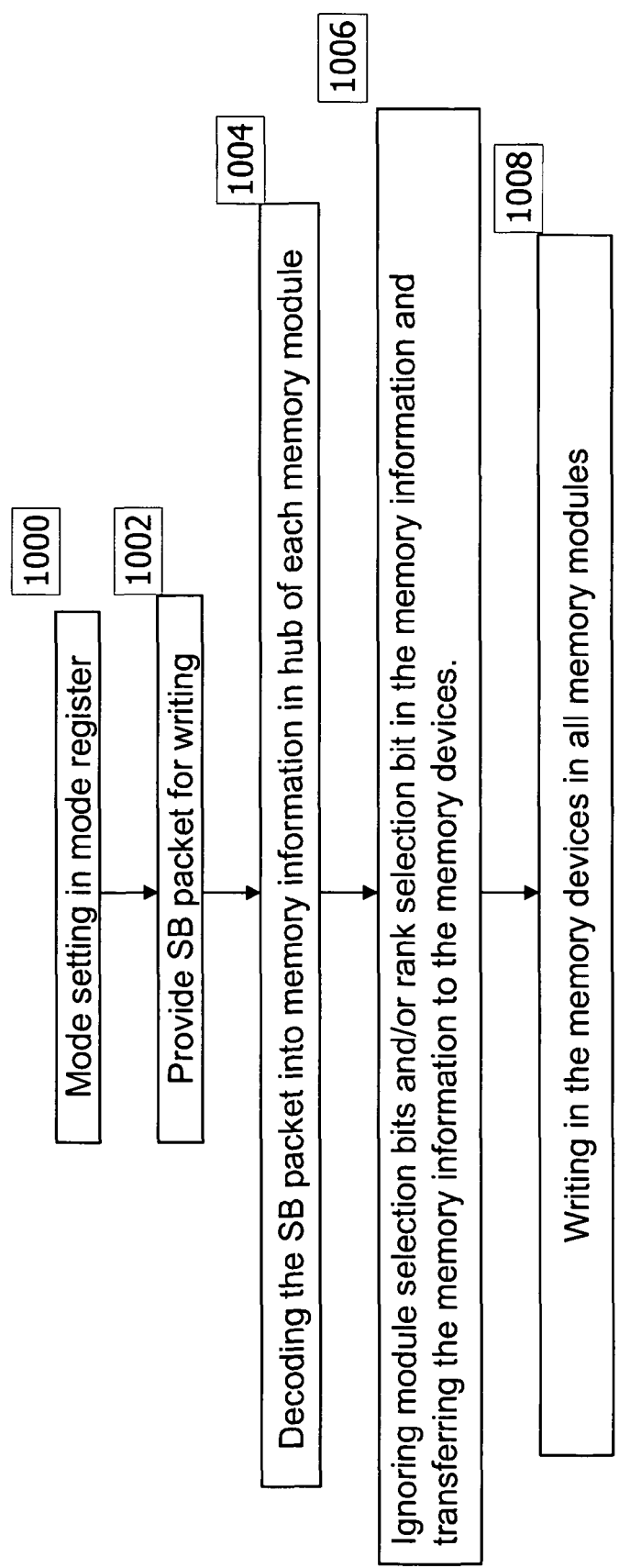
FIG. 10B illustrates a flowchart for writing in a test mode in an example embodiment of the present invention.

FIG. 10B illustrates a flowchart for writing in a test mode in an example embodiment of the present invention. In the flowchart illustrated in FIG. 10B, it is assumed that an active operation is conducted before a write SB packet may be written.

As illustrated in 1000, the mode is set in the mode register, for example, the mode is set to a test mode. In 1002, a write SB packet is provided to each memory module 500 for writing. In 1004, the write SB packet is decoded into memory information in a hub of each memory module 500. In 1006, the module selection bits and rank selection bits in the memory information are ignored responsive to the test mode and the remaining memory information is transferred to each of the memory devices 520. In 1008, the write operation is performed in the memory devices 520 in each memory module 500.

FIG. 11A illustrates an example timing diagram for a read operation in a test mode in accordance with an example embodiment of the present invention. As illustrated in the first read period 1', the mode register is set by the SMBus. By setting the mode to a test mode, the module selection bits and the memory information may be ignored. In the second read period 2', an active SB packet is provided and all memory modules conduct an active operation. In a third read period 3', a read SB packet for reading in the memory devices 520 in the plurality of memory modules 500 is provided to all memory modules. The read SB packet is decoded into memory information in the PTP in each of hub of all memory modules 500. Module selection bits included the memory information are ignored in the test mode. The remaining memory information is transferred to the memory interface 30 in each hub 510. The memory devices 520 on all memory modules 500 conduct a read operation based on the remaining memory information at the same time and, in a fourth read period 4', data read from the memory devices 520 is encoded into packet information which was received by the PTP in each hub 510.

In a fifth read period 5', the last memory module 520, MMn transmits the packet data to the NRx port of an adjacent upstream memory module 520, MMn−1. In this manner, the packet data from the last memory module 520, MMn may be transferred to the memory controller 600 during one clock cycle of the CLK_MEM.

In a sixth read period 6', the hub 510 in each of the memory module 520, M1-MMn−1 except the last memory module 520, MMn receives the packet data from the downstream memory module 520, MMn−1. Each comparator COM in each memory module 520, MMn−1 except the last memory module 520, MMn compares the received packet data and packet data from the memory module 520, MMn−1 itself. In a seventh read period 7', if the result of the comparison indicates the data is the same, the comparator COM outputs a pass signal to the RG2. If the data is not the same, the comparator COM outputs a fail flag to RG2.

In an eighth read period 8', the memory controller reads all the RG2s to identify whether each memory module 520, MMn is operating properly or not.

Figure 11B:
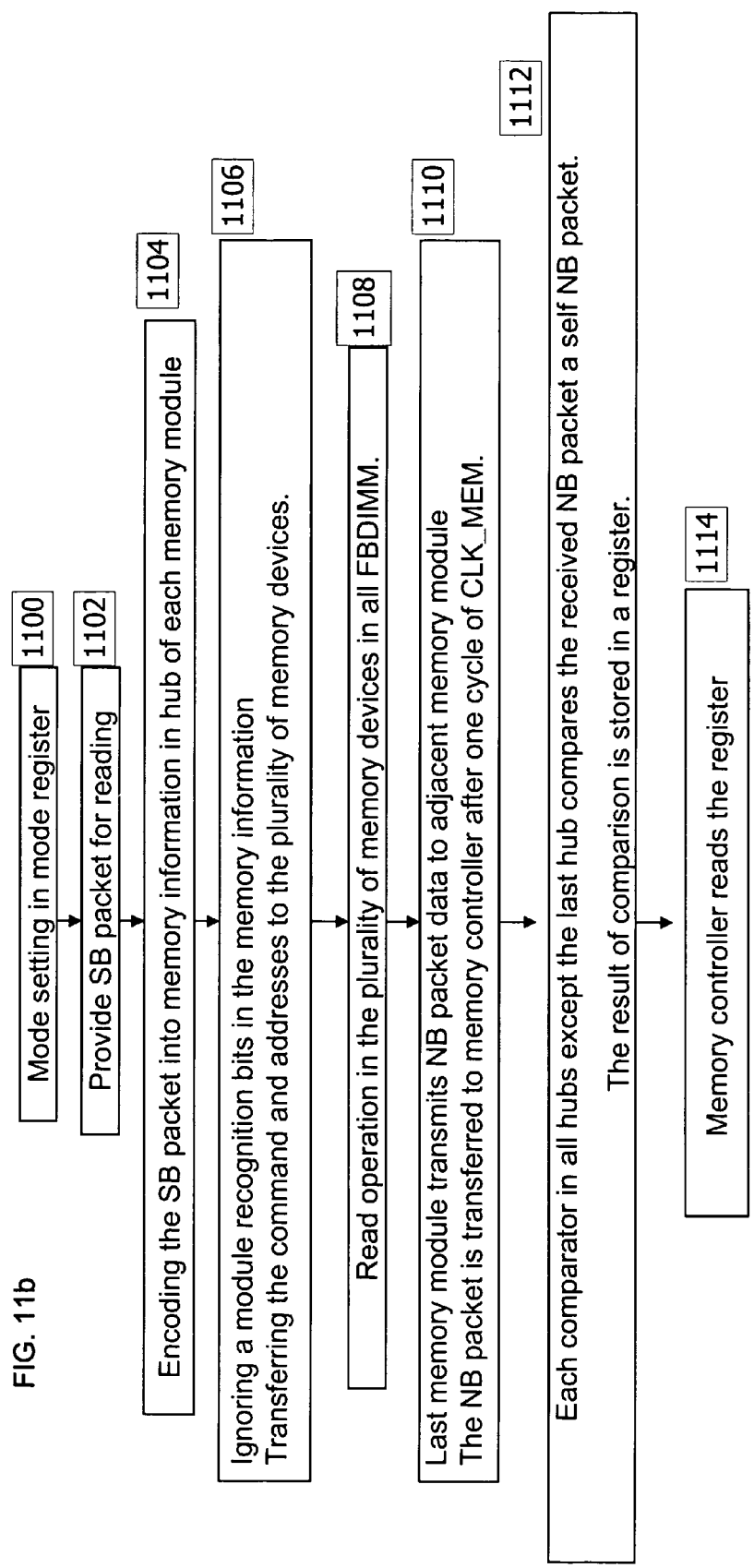
FIG. 11B illustrates a flowchart for reading in a test mode in an example embodiment of the present invention.

FIG. 11B illustrates a flowchart for reading in a test mode in an example embodiment of the present invention.

As illustrated in 1100, the mode is set in the mode register, for example, the mode is set to a test mode. In 1102, a read SB packet is provided to all memory modules 500. In 1104, the read SB packet is decoded into memory information in a hub 510 of each memory module 500. In 1106, the module selection bits and/or rank selection bits in the memory information are ignored and command and address information is transferred to each of the memory devices 520. In 1108, the read operation is performed in the memory devices 520 in each memory module 500.

In 1110, a last memory module 500, MMn transmits NB packet information to an adjacent upstream memory module 500, MMn−1. The NB packet is transferred up to the memory controller 600 in one clock cycle of the CLK_MEM. In 1112, each comparator COM in each hub 510 of each memory module 520, MMn−1, except the comparator COM in hub 510 of the last memory module 520, MMn compares the received NB packet and a self-generated NB packet. The result of the comparison is stored in the RG2 register. In 1114, the memory controller 600 reads the RG2 register to determine whether each memory module 500, MMn is operating properly.

Figure 12:
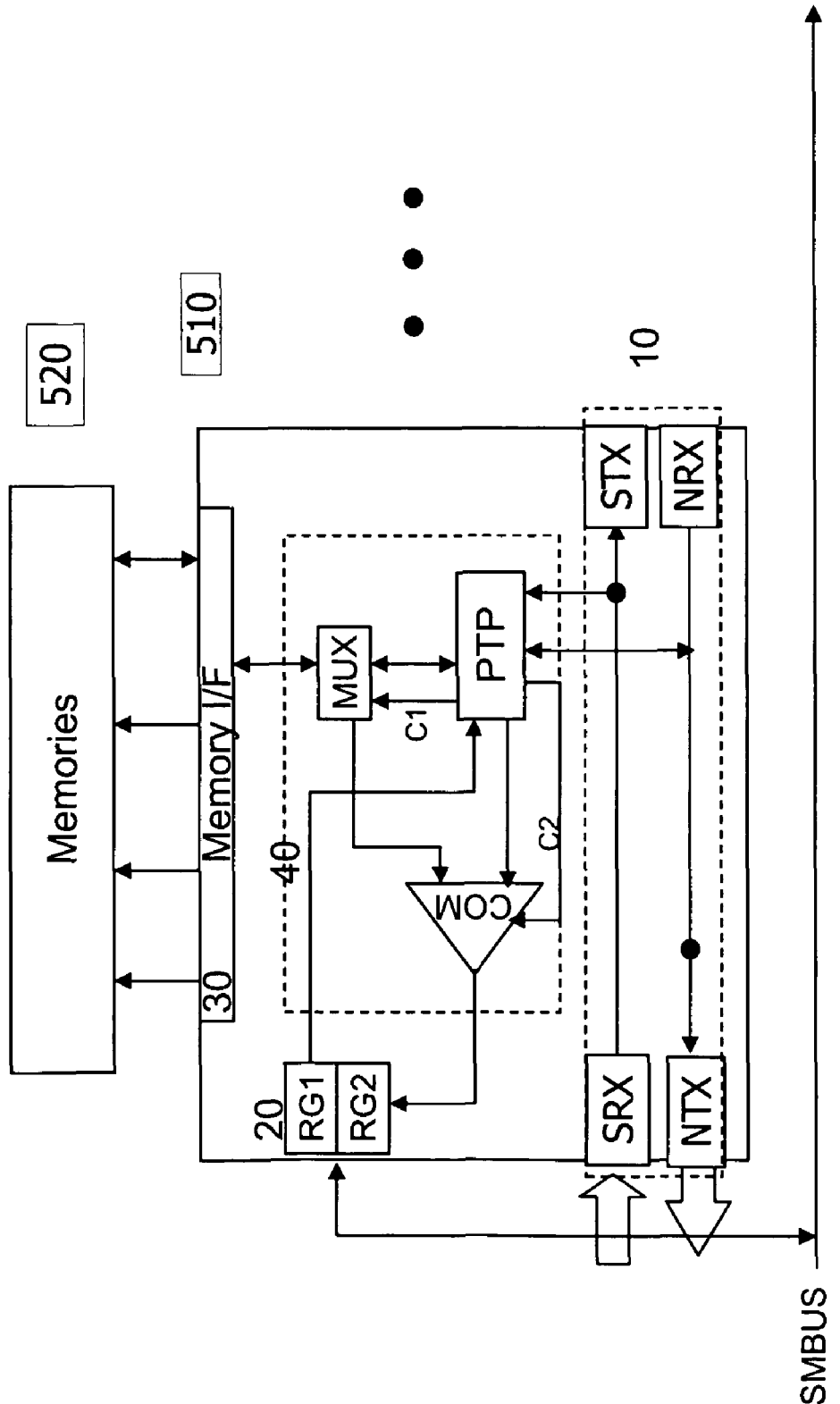
FIG. 12 illustrates a hub comparing first self data and second data from an adjacent memory module in an example embodiment of the present invention.

FIG. 12 illustrates a comparison of first self data and second data from an adjacent memory module 500, MMn in a hub, as illustrated in FIG. 9. FIG. 12 is similar to FIG. 9, except in FIG. 9, packet information is compared in the comparator COM, whereas, in FIG. 12, memory information is compared in the comparator COM.

As illustrated in FIG. 12, each hub 510 may again include a receiver/transmitter 10 further including a plurality of receivers and transmitters SRx, STx, NRx, NTx, such as those described above in conjunction with FIGS. 2-3, 5 and 9.

Each hub 510 may also include an interface 20, a memory interface 30, and a control circuit 40. The control circuit 40 may further include a comparator COM, a packet transaction part (PTP), and a multiplexer (MUX), similar to FIG. 9.

The receiver/transmitter 10 may receive and/or transmit packets. The receiver/transmitter 10 may transfer packets from a host, such as the host of FIGS. 3-5 and 9, a memory controller, such as the memory controller of FIG. 8, or from an adjacent FBDIMM in both directions.

The interface 20 may include a mode register RG1 for setting a test mode and a fail detection register RG2. The interface 20 may receive and transmits system management information to and from the memory controller via the SMBus. In particular, the mode register RG1 may store a test mode signal and may transfer the test mode signal to the PTP. The fail detection register RG2 may receive a fail flag from the comparator COM and may transfer the fail flag to the memory controller via the SMBus.

The memory interface 30 may receive memory information including command, addresses and data information for writing from the MUX and may transfer the memory information to the plurality of memory devices 520. The memory interface 30 may also transfer read data from the plurality of memory devices 520 to the MUX of the control circuit 40.

The PTP may decode the southbound packets from packet format into memory information format which may include module selection bits, command bits, one or more rank selection bits, command information and/or address information and may transmit and receive packet information in a northbound direction.

In a normal mode, a PTP may determine whether the module selection bits indicate the FBDIMM of which the PTP is a part. If the module selection bit indicates the FBDIMM of which the PTP is a part, the PTP may decode packet information into memory information and send command and address information to the memory interface 30, via the MUX. Otherwise, the PTP may ignore the memory information. If the command is a write operation, write data is also transferred by the PTP to the memory interface 30, via the MUX.

In a test mode, the PTP may transfer command and address information to the memory interface 30, via the MUX, regardless of whether the specific FBDIMM is identified (for example, by the module selection bits).

In particular, the multiplexer MUX located between the PTP and the memory interface 30 forms a first path and a second path. In normal mode, the MUX transfers an NB packet to the PTP and on to the NTx through the first path in response to a first control signal C1 from the PTP.

In a test mode, the MUX transfers an NB packet to the comparator COM through the second path, which is responsive to a first control signal C1 from the PTP. The comparator COM has two inputs, one of which is connected to the PTP and the other of which is connected to the second path of the multiplexer MUX. The comparator COM is enabled by a second control signal C2 from the PTP. An output of the comparator COM is connected to the RG2 for storing a result of the compare operation.

As shown in FIG. 12, NB packet from an adjacent downstream memory module 500, MMn may input to the PTP. The PTP may decode NB packets into memory information. The PTP may receive memory information from a current memory 520 and memory information from other adjacent memories 520 and compare the memory information in the comparator COM.

Although one or more example embodiments of the present invention have been described in conjunction with FBDIMMs, the teachings of the present invention are applicable to other memory modules, such as R-DIMMs or SIMMs. Further, although one or more example embodiments of the present invention have been described in conjunction with DRAMs, the teachings of the present invention are applicable to other memory types.

Further, although one or more example embodiments of the present invention have been described in conjunction with a host or memory controller, the teachings of the present invention are applicable to other controller types. Further, although one or more example embodiments of the present invention have been described in conjunction with module selection bits and/or rank selection bits, any memory identifying information which identifies memory modules, memory devices or memory units may be utilized.

It will be apparent to those skilled in the art that other changes and modifications may be made in the above-described example embodiments without departing from the scope of the invention herein, and it is intended that all matter contained in the above description shall be interpreted in an illustrative and not a limiting sense.

I claim:

1. A hub for a memory module, the memory module including a plurality of memory units, the hub comprising:
   a control circuit for ignoring memory identification information included in memory information decoded from a southbound packet from a memory controller in a test mode; and
   a memory unit interface for interfacing with at least one memory unit;
   wherein the control circuit includes,
      a packet transaction part for receiving and decoding the southbound packet into the memory information, and wherein
         responsive to the test mode, the packet transaction part transfers the memory information except the memory identification information to the memory unit interface regardless of the memory identification information,
         responsive to a normal mode, the packet transaction part transfers the memory information except the memory identification information to the memory unit interface based on the memory identification information, and
      the memory unit interface sends the memory information except the memory identification information to the at least one memory unit.

2. The hub of claim 1, wherein the southbound packet is for one of an active operation, write operation and read operation.

3. The hub of claim 2, wherein the control circuit further includes,
   a receiver for receiving the southbound packet, and
   a transmitter for transmitting the southbound packet to a hub of a downstream memory module.

4. The hub of claim 3, wherein the control circuit further includes,
   a register for storing the test mode.

5. The hub of claim 4, wherein the memory information includes a command, addresses and/or data for write.

6. A hub for a memory module, the memory module including a plurality of memory units, the hub comprising:
   a control circuit for receiving first output information from at least one memory unit of the memory module, and comparing the first output information with second output information from a downstream memory module in a test mode, and outputting a comparison result;
   wherein the control circuit includes,
      a comparator for comparing the first output information with the second output information, and outputting the comparison result,
      a packet transaction part for converting data from at least one memory unit into the first output information, and
      a multiplexer for receiving the first output information and outputting the first output information to a hub of an upstream memory module in a normal mode, but outputting the first output information to the comparator in the test mode.

7. The hub of claim 6, wherein the control circuit further includes,
   a receiver for receiving the second output information from the downstream memory module; and
   a transmitter for sending the first output information or the second output information to an upstream memory module or a memory controller.

8. The hub of claim 7, wherein the control circuit further includes,
   a first mode register for storing the test mode, and
   a second register for storing the comparison result.

9. The hub of claim 8, wherein the first output information and the second output information are packets including a read data.

10. The hub of claim 1, wherein the memory identification information includes at least one module selection bit.

11. A hub, comprising:
    a receiving and transmitting part for receiving a first packet from a first receiver via a first receiving bus and transmitting the first packet via a first transmitting bus, and receiving a second packet from a second receiver via a second receiving bus and transmitting the second packet via a second transmitting bus;
    a first interfacing part for receiving a test mode and sending a result of the test mode to and from a memory controller through a third bus;
    a second interfacing part for sending memory information from the first data packet to a plurality of memory units and receiving data to and from the plurality of memory units; and
    a packet transaction part for unconditionally transferring the memory information except memory identification information to the plurality of memory units through the second interfacing part regardless of the memory identification information in response to the test mode and comparing the second packet with the data output from the plurality of memory units.

12. A memory module comprising:
    a plurality of memory units; and
    a hub connected to the plurality of memory units, the hub ignoring memory identification information included in memory information decoded from a southbound packet from a memory controller, and writing data associated with the southbound packet to each of the plurality of memory units in a test mode, the hub including,
       a packet transaction part for receiving and decoding the southbound packet into the memory information, and
       a memory unit interface for interfacing with at least one memory unit, wherein
    responsive to the test mode, the packet transaction part transfers the memory information except the memory identification information to the memory unit interface regardless of the memory identification information, and
    the memory unit interface sends the memory information except the memory identification information to the at least one memory unit.

13. The memory module of claim 12, wherein the hub further includes,
    a first receiver for receiving the southbound packet,
    a first transmitter for sending the southbound packet,
    a mode register for storing the test mode, and wherein
    the memory interface writes the memory information to the plurality of memory units.

14. The memory module of claim 13, wherein the hub further includes,
    a second receiver for receiving a first northbound packet including first data;
    a second transmitter for sending the first northbound packet; and
    a comparator for comparing the first northbound packet with a second northbound packet output from the plurality of memory units, responsive to a read packet including a read command and addresses.

15. The memory module of claim 14, wherein the hub further includes,
    a second register for storing a result of the comparator, the comparator being enabled responsive to the test mode.

16. A memory system, comprising:
a memory controller; and
a plurality of memory modules connected to the memory controller in a daisy chain, each of the plurality of memory modules including a hub, each hub ignoring memory identification information included in memory information decoded from a southbound packet from the memory controller, and writing data associated with the southbound packet to each of a plurality of memory units of the plurality of memory modules in a test mode, each hub including,
a packet transaction part for receiving and decoding the southbound packet into the memory information, and
a memory unit interface for interfacing with at least one memory unit; wherein
responsive to the test mode, the packet transaction part transfers the memory information except the memory identification information to the memory unit interface regardless of the memory identification information, and
the memory unit interface sends the memory information except the memory identification information to the at least one memory unit.

17. The memory system of claim 16, wherein each hub further includes,
a first receiver,
a first transmitter,
a mode register for storing the test mode, and wherein
the memory interface writes the memory information to the plurality of memory units.

18. The memory system of claim 17, wherein each hub further includes,
a second receiver for receiving a first northbound packet including first data,
a second transmitter for sending the first northbound packet, and
a comparator for comparing the first northbound packet with a second northbound packet output from the plurality of memory units, responsive to a read packet including a read command and addresses.

19. The memory system of claim 18, wherein each hub further includes,
a second register for storing a result of the comparator, the comparator being enabled responsive to the test mode.

20. The memory system of claim 19, wherein the first register and the second register are connected to a host by a system management bus.

21. A method of writing to a memory system having a host and N memory modules (where N is an integer ≧1), the method comprising:
setting a test mode in the N memory modules;
transferring a write packet to the N memory modules;
decoding the write packet into memory information including memory identification information in each of the N memory modules;
providing the memory information except the memory identification information to memory units on each of the N memory module regardless of the memory identification information after ignoring the memory identification information responsive to the test mode; and
writing data included in the memory information to the memory units on each of the N memory module.

22. The method of claim 21, wherein the host and the N memory modules are connected by a daisy chain.

23. The method of claim 22, wherein the test mode is set via a system management bus.

24. A memory module, comprising:
a plurality of memory units; and
a hub including a control circuit for receiving first output information from at least one memory unit, and comparing the first output information with second output information from a downstream memory module in a test mode, and outputting a comparison result;
wherein the control circuit includes,
a comparator for comparing the first output information with the second output information, and outputting the comparison result,
a packet transaction part for converting data from at least one memory unit into the first output information, and
a multiplexer for receiving the first output information and outputting the first output information to a hub of an upstream memory module in a normal mode, but outputting the first output information to a comparator in the test mode.

25. The memory module of claim 24, wherein at least one of the first and second output information is one of packet information and memory information.

26. The memory module of claim 25, wherein the downstream memory module is one of an adjacent downstream memory module and a last memory module.

27. A memory system, comprising:
a memory controller; and
a plurality of memory modules, each of the plurality of memory modules including a hub, each hub including a control circuit for receiving first output information from at least one memory unit, and comparing the first output information with second output information from a downstream memory module in a test mode, and outputting a comparison result;
wherein the control circuit includes,
a comparator for comparing the first output information with the second output information, and outputting the comparison result,
a packet transaction part for converting data from at least one memory unit into the first output information, and
a multiplexer for receiving the first output information and outputting the first output information to a hub of an upstream memory module in a normal mode, but outputting the first output information to the comparator in the test mode.

28. The memory system of claim 27, wherein at least one of the first and second output information is one of packet information and memory information.

29. The memory system of claim 28, wherein the downstream memory module is one of an adjacent downstream memory module and a last memory module.

30. A method of reading a memory system having a host and a plurality of modules, the method comprising:
converting, at a hub of a first memory module, data from at least one memory unit into first output information;
outputting, by the hub of the first memory module, the first output information to a hub of an upstream memory module in a normal mode, and comparing the first output information with second output information from a downstream memory module to generate a comparison result in a test mode; and
outputting the comparison result if the comparison result is generated.

31. The method of claim 30, wherein the downstream memory module is adjacent to the first memory module or a last memory module in the memory system.

32. A method of testing a memory system having a memory controller and a plurality of memory modules, the plurality of memory modules being connected to a host by a daisy chain, the method comprising:
- setting a test mode to the plurality of memory modules;
- simultaneously writing test data to each memory unit on the plurality of memory modules in the test mode;
- decoding, at a hub of each memory module, the write test data into memory information including memory identification information;
- transferring, by the hub, the memory information except the memory identification information to a memory unit interface of the memory module regardless of the memory identification information; and
- performing a write operation in the memory units.

33. A hub for a memory module, the memory module including a plurality of memory units, the hub comprising:
- a control circuit for ignoring at least module selection bits included in memory information decoded from a southbound packet from a memory controller in a test mode; and
- a memory unit interface for interfacing with at least one memory unit;

wherein the control circuit includes,
- a packet transaction part for receiving and decoding the southbound packet into the memory information including the module selection bits, one or more rank selection bits, command information and address information, and wherein
  - responsive to the test mode, the packet transaction part transfers the memory information except the module selection bits and the one or more rank selection bits to the memory unit interface regardless of the module selection bits and the one or more rank selection bits, and
  - the memory unit interface sends the memory information except the module selection bits and the one or more rank selection bits to the at least one memory unit.

\* \* \* \* \*